Patented Mar. 22, 1932

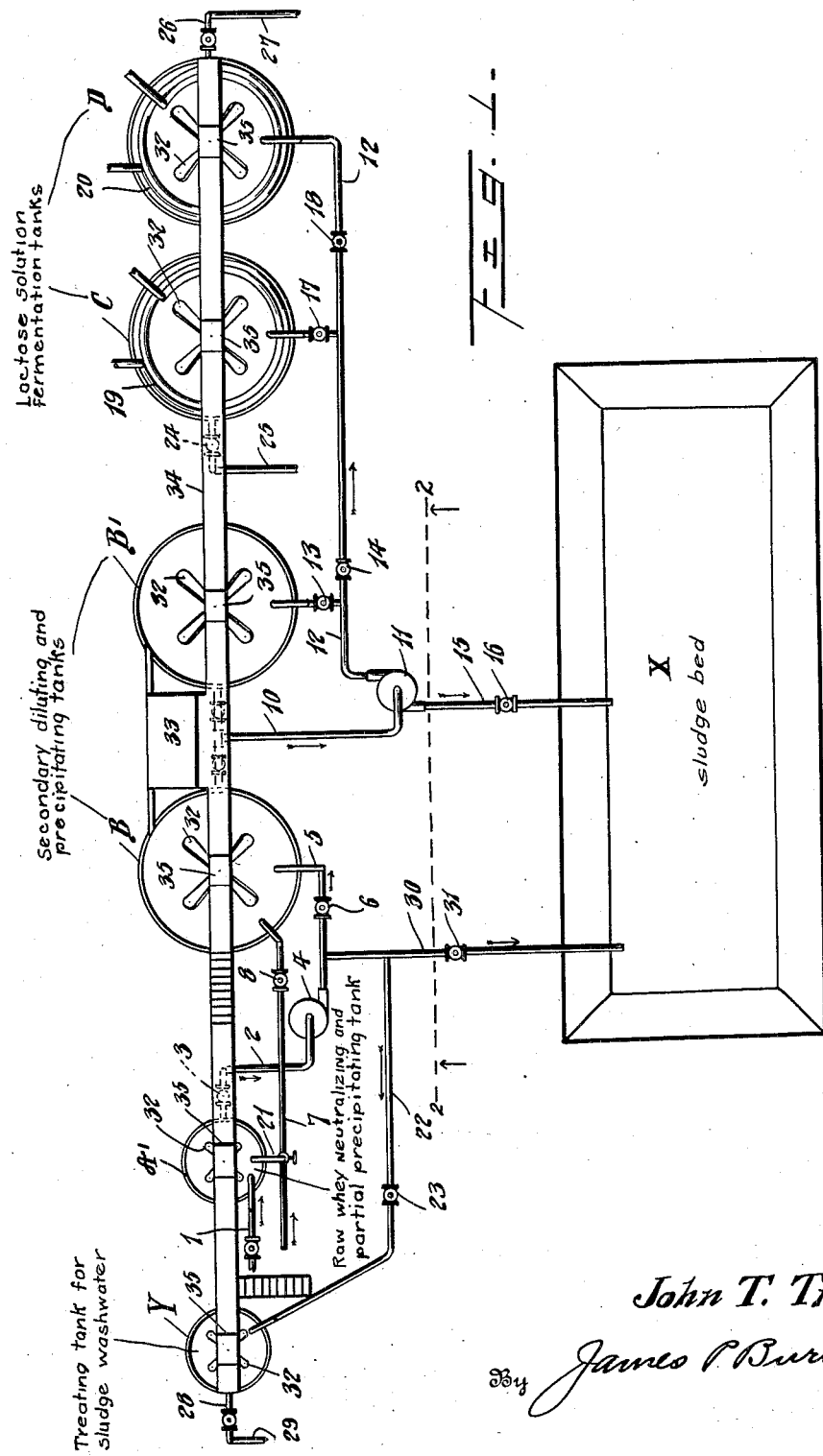

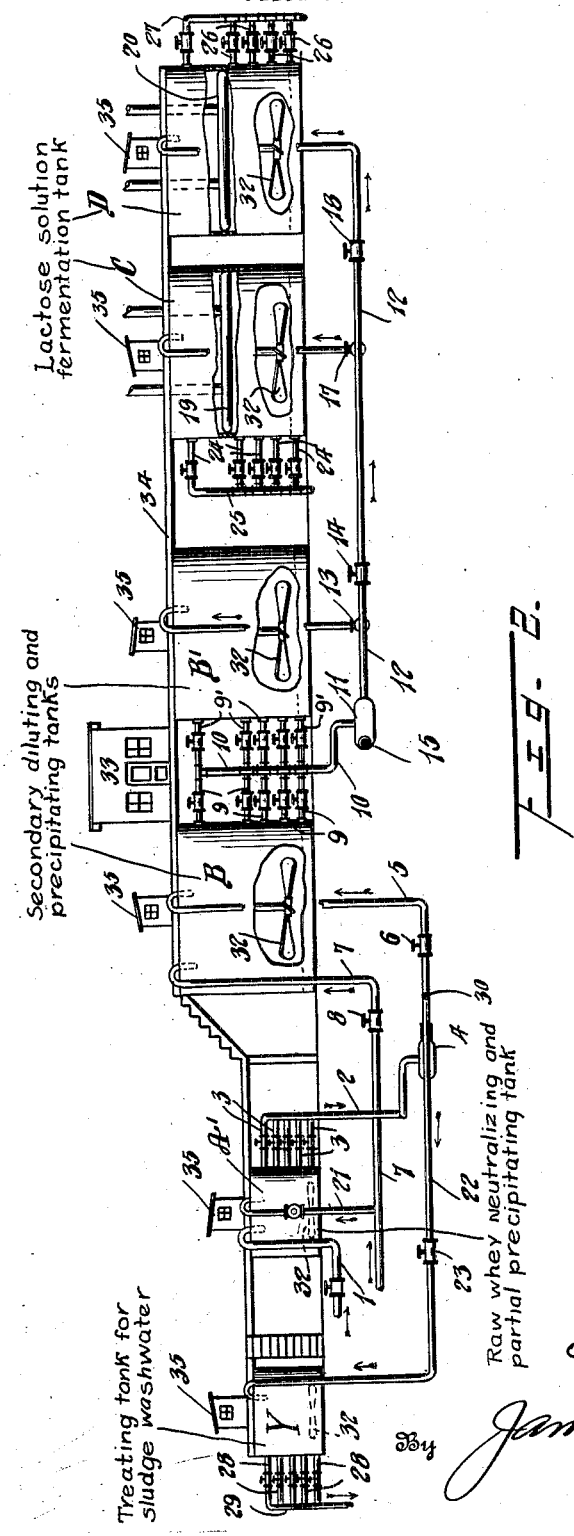

1,850,643

UNITED STATES PATENT OFFICE

JOHN T. TRAVERS, OF COLUMBUS, OHIO, ASSIGNOR, BY DIRECT AND MESNE ASSIGNMENTS, TO THE OHIO SANITARY ENGINEERING CORPORATION, OF COLUMBUS, OHIO, A CORPORATION OF OHIO

PROCESS FOR RECOVERING CALCIUM LACTATE FROM WHEY

Application filed October 24, 1927. Serial No. 228,481.

This invention relates to a process for the recovery of calcium lactate from whey which is discharged from cheese factories and the like.

The invention has for its object the effective purification of this highly putrescible substance so that the effluent may be discharged into running streams or other bodies of water without danger of pollution or deleterious effects upon aquatic life.

It is a more specific object of the invention to accomplish the purification of this waste and to also recover as by-products of the purification process a sludge of high fertilizing value and a very substantial quantity of calcium lactate.

To the end that the process may be better understood, a discussion of the character of whey will be here given:

Whey is the waste product formed during the process of the manufacture of cheese. It is a milky-looking liquid of a slightly greenish color with an odor of sour or spoiled milk. Its specific gravity is very high and is probably the most concentrated of all the organic industrial wastes. The average composition of whey is as follows:

| | Per cent |
|---|---|
| Water | 93.04 |
| Solids | 6.96 |

The 6.9% solids represent:—

| | |
|---|---|
| Fat | .36 |
| Proteins | .84 |
| Sugar, salts, etc. | 5.76 |

In the average factory practice 49% of the milk solids go into the whey. The yield of whey is about 88 pounds per 100 pounds of milk. The larger the percentage of sugar, albumin and soluble salts in the milk, the larger will be the percentage of these substances in the whey. Thus the composition of the whey will vary as the composition of the milk varies. The composition of the whey will also vary with the loss of milk constituents due to the conditions attending the operation of the cheese making.

Albumin remains in solution during the cheese making process, and passes out for the most part, with the whey. The milk sugar in milk averages about 5%. It passes out largely with the whey during the cheese making process and forms a fairly large percentage of the solids in the whey. The milk sugar is subject to fermentation but it is not putrescible. The albumin is, however, very putrescible and forms on decomposition the two putrefaction bases, cadaverine and putrescine.

About 7% of the fat in the milk passes into the whey during the cheese making process. About .1 pound of casein passes into the whey per 100 pounds of milk. These two bodies are also very putrescible.

During the coagulation of casein during the manufacture of cheese a whey protein is formed. It is a proteose substance and contains 13.2% of nitrogen. It remains in solution while the para-casein-lime precipitates out. This whey protein is a very putrescible substance.

The amount of milk sugar in the whey decreases as the lactic acid content increases. This is due to the fermentation of the milk sugar by the action of micro-organisms, lactic acid being formed from the milk sugar. This capacity of the milk sugar to form lactic acid is an important factor in my process and enables me to recover the calcium lactate.

The putrescible matter in the whey thus is composed of albumin, casein, fat and the whey protein. The fermentable matter consists of milk sugar. The mineral matter consists of potash, phosphates and smaller amounts of other salts.

Proteins are combinations of amino acids. They are colloidal bodies of high molecular weight, carry a positive charge in an acid solution and a negative charge in an alkaline solution. This phase is due to the adsorption of H ions in the one case and OH ions in the other. In the whey, the proteins are positive as the whey is acid. These proteins can be precipitated from an alkaline solution by the use of a suitable electrolyte. The potassium and phosphorus compounds are combined in some complex form in the whey. The phosphates are very active colloids and can be easily precipitated from an alkaline solution carrying the potash down. Thus we have a condition whereby it is possible to precipitate the proteins from the whey and at the same time precipitate the combined phosphate and potash salts. Only the milk sugar remains and as it is in true solution and does not dissociate, it is not affected by the electrolyte employed in the process.

The effluent subsequent to treatment with the electrolyte in the process still contains an average of 3.5% lactose or substantially 290 pounds per thousand gallons of the whey. The lactose is an inert material. It will, however, under proper temperature conditions, unite with its own water of crystalization to form lactic acid, as shown by the following equation:

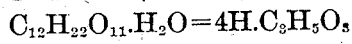

$$C_{12}H_{22}O_{11}.H_2O = 4H.C_3H_5O_3$$

One molecule of lactose hydrolyzes to form four molecules of lactic acid. This process is known as lactic fermentation. It is a spontaneous operation requiring no assistance from outside agencies except a temperature control.

The process will be described in connection with an apparatus suitable for practicing the same. Such an apparatus is shown in the accompanying drawings in which:

Figure 1 is a diagrammatic plan view of an apparatus suitable for carrying out the process, and Fig. 2 is a side elevational view taken along the line 2—2 of Figure 1.

Describing the operation of the process with respect to the apparatus, the raw whey is delivered through line 1 to a primary treating tank A—1 having a capacity of substantially 5000 gallons. To the 5000 gallons of whey an initial amount of a reagent containing an electrolyte (hereinafter described) of substantially 200 pounds is added to effect a partial neutralization of the lactic acid content of the waste. The quantity of electrolyte may vary within relatively wide limits, as for example, from 180 to 200 pounds for 5000 gallons of whey. Following the introduction of the electrolyte a quantity of lime is added to the whey in tank A—1, to complete the neutralization of the acid and raise the pH to substantially 9. Usually a quantity of lime of substantially 300 pounds will be found sufficient to treat 5000 gallons of the whey in this step. The quantity of lime employed, it is to be understood, will be sufficient to raise the pH to the desired degree, that is, substantially nine. The pH of the liquid can be readily ascertained in any known manner, as, for example by the color method. Substantial precipitation occurs in tank A—1 due to the dissociation of the electrolyte producing material and the freeing of positive ions for adsorption by negatively charged colloids. The sludge precipitated in tank A—1 is subjected to further treatment in a manner to be hereinafter described.

The effluent derived from the treatment of the whey in tank A—1 is passed via the line 2 having a plurality of vertically spaced valve controlled connections 3 with tank A—1, to the pump 4 and forced through line 5 controlled by valve 6 to a second treating tank B, having a capacity of substantially 10,000 gallons. To the 5000 gallons of whey effluent delivered to the tank B is added an equal amount of water to give a dilution of 1 to 1. The water is introduced to tank B through the line 7 controlled by valve 8. This dilution effects a lowering of the specific gravity of the solution in tank B to substantially 1.1 or below. After the proper dilution is secured in tank B, the liquid is further treated therein with a mixture containing an electrolyte. The treating mixture used in tank B may contain from 24 to 30 parts of $FeSO_4$, 24 to 30 parts $CaSO_4$, and from 43 to 49 parts of waste dust recovered from the precipitators employed in the manufacture of cement, such waste dust having a substantial calcium carbonate content. Or, instead of the waste dust from the precipitators employed in the manufacture of cement, I may use a waste material from an alkali plant, representing the solid constituents separated from the waste liquors discharged from an alkali plant during the manufacture of chlorine, chloride of lime and caustic soda. An amount of this treating mixture should be used which will be sufficient to precipitate substantially 75% of the solids present in the liquid introduced to tank B. I find that it is impractical to attempt complete clarification of this concentrated whey liquor in tank B. The proper amount can be determined by testing the liquid and the effluent for the solid content. Usually a quantity of this treating mixture, ranging from 200 to 250 pounds will be found adequate for the treatment of the 10,000 gallons of liquid representing diluted whey contained in the tank B. The mixture incorporated with the waste liquid in the tank B, it will be noted, contains a substantial quantity of electrolyte in the form of calcium sulphate, and either the waste dust from the manufacture of cement or the solid waste from the alkali plant, both of the latter having a high calcium carbonate content. The mixture also contains ferrous sulphate which functions as a coagulant. The reaction effected in the tank B may be explained as follows:

Lime when mixed with water forms calcium hydroxide and the action of this calcium hydroxide on the ferrous sulphate forms a negatively charged ferrous hydroxide. The electrolyte supplies, in the instance given, the positively charged calcium ions. This is due to the fact that the electrolyte dissociates in a water solution into positive ions and negative ions. In this instance, the negative ions are carbonate and sulphate ions.

In the alkaline solution the sign of the proteins is negative. The proteins are, therefore, precipitated by the positive calcium ions. The charges on the colloidal proteins are neutralized to the isoelectric point by the adsorption of the positive calcium ions. Precipitation then takes place. At the instant of coagulation the entire solution is permeated by the flocculent ferrous hydroxide and solid matter not in true solution is enveloped and carried down by the hyroxide. Phosphates are precipitated and fat particles also carried down.

The clarification is not completed in the treatment carried out in the tank B. Accordingly, the effluent from tank B is passed through one of the vertically spaced draw-off lines 9 to the header 10 and thence forced by pump 11 through line 12 and valve 13 to tank B—1, valve 14 being closed. To the 10,000 gallons of effluent collected in the tank B—1 is added a second treating mixture for the purpose of securing complete clarification of the liquid. This second treating mixture may advantageously be composed of the following ingredients in the proportions given:

56 parts of waste dust recovered from the precipitators employed in the manufacture of cement.

13 parts of calcium hydroxide.

31 parts of ferrous sulphate ($FeSO_4$).

In lieu of the waste from the precipitators employed in the manufacture of cement, I may employ in this mixture a like quantity of the solid waste recovered from the waste liquors discharged from an alkali plant. It will be understood that the proportions of the constitutents given are merely illustrative and that they may vary within wide limits as, for example, 10% either way. A quantity of this mixture will be employed in the second treatment of this effluent in the tank B—1, sufficient to secure complete clarification of the liquid. The proper amount may be determined by making a few trial tests, noting the rapidity of the precipitation, the size of the floc, and the degree of clarification. Usually from 200 to 250 pounds of the treating mixture will be found adequate to completely clarify 10,000 gallons of liquid in tank B—1 and in many instances a substantially lesser quantity will give satisfactory results. All the putrescible organic content of the whey is separated during the treatment above described and collects as a precipitate in the various tanks. This precipitate, or sludge, is recovered as a fertilizer. The sludge separated from the whey in tanks B and B—1 is flushed out of these tanks through the lowest draw-off line having communication with header 10 and forced by pump 11, valves 13 and 14 being closed, through line 15, controlled by valve 16 (Figure 1) to a conventional underdrained sludge dewatering bed X.

The effluent produced by the treatments hereinbefore described still contains substantially 3.5% of lactose, or around 290 pounds of lactose for each 1000 gallons of the liquid. This lactose as heretofore pointed out, is present in the liquid in true solution. It is also an inert material having no chemical affinity, and therefore is not separated from the effluent in the treatments thus far described. The lactose, however, contains one molecule of water of crystallization and readily hydrolyzes, forming lactic acid. To recover lactic acid from the effluent discharged from tank B—1, this effluent is treated in the following manner:—

The effluent passes from tank B—1 through one of the draw-off lines 9', header 10, pump 11, line 12, valve 13 being closed and valve 14 open, to one of alternate fermentation tanks, C or D. When the liquid is supplied to tank C, valve 17 will be opened and valve 18 closed and the reverse will be true when the liquid is being supplied to tank D. Each of these tanks is provided with means for controlling the temperature of the liquid therein, such for example, as the steam coils 19 and 20. The lactose will hydrolyze without the aid of any reagent, by merely controlling the temperature conditions during the period of fermentation. I find, that for proper results, the temperature of the effluent should be maintained at from 80 to 95° F. When maintained at this temperature, for a period of substantially 24 hours, an amount of the lactose, equal to about 1.5% of the effluent is converted into lactic acid. When the lactic acid reaches this concentration, however, the micro-organisms causing the fermentation can no longer function in the acid solution and further hydrolysis of the lactose cannot be effected. This concentration, as stated, is usually reached in a 24 hour period of fermentation. At the expiration of this 24 hour period of fermentation, and when the concentration of the lactic acid is so great as to prevent further fermentation, the effluent is treated with lime in an amount sufficient to raise the pH of the liquid to from 8.5 to 9. The proper amount of lime to be employed may be determined by testing the effluent for the pH. Usually, from 280 to 320 pounds of lime will be sufficient to raise the pH of the effluent to the desired degree. The addition of this lime to the effluent effects a precipitation of calcium lactate, according to the following formula:

$2H.C_3H_5O_3 + Ca(OH_2) = Ca(C_3H_5O_3)_2 + 2H_2O$

Since this concentration of the lactic acid reaches a degree which prevents further fermentation, after only a quantity of the lactose, equal to 1.5% of the effluent has been hydrolyzed, it is evident that the effluent still contains substantially 2% of lactose. Of this 2%, 1.5% can be further hydrolyzed by repeating the fermentation action above described, that is, again maintaining the effluent at a temperature ranging from 80 to 95° F. for a second period of 24 hours, or until the concentration of the lactic acid has become so great as to prevent further fermentation. At this time a further quantity of calcium lactate may be precipitated by again raising the pH of the effluent to from 8.5 to 9, by the further introduction of lime. In the event that a further yield of calcium lactate is desired, such further yield may be obtained by following the introduction of the lime in each instance with the addition of a quantity of calcium chloride, or other soluble salt of calcium, such, for example, as calcium nitrate. An amount of calcium chloride may be added sufficient to depress the solubility point of the calcium lactate and thus effect a further precipitation of calcium lactate. Usually 50 pounds of calcium chloride will be found sufficient for the treatment of 10,000 gallons of the effluent. The quantity of calcium chloride suitable for treatment of any given liquid, can be ascertained by making a few trial tests and adding calcium chloride until no further precipitation of calcium lactate occurs. Since a period of 48 hours is required to effect the desired recovery of calcium lactate, it is necessary to use the tanks C and D alternately, each tank taking care of one day's output.

Returning to the sludge, or precipitate, separated from the raw whey in tank A—1. I have found that after the treatment of two batches of 5000 gallons each of raw whey in tank A—1, it is desirable and advantageous to wash the accumulated sludge and thus remove therefrom the calcium lactate precipitated in tank A—1, as a result of the neutralization of the lactic acid originally present in the raw whey. To accomplish the washing of the accumulated sludge in tank A—1, I introduce thereto substantially 5000 gallons of water through branch 21 of water line 7, and agitate the same to effect a thorough washing of the sludge, which is accompanied by a solution of the calcium lactate content of the sludge. I then draw off the supernatant liquid resulting from the washing of the sludge in the tank A—1, and pass this liquid via line 2, pump 4, line 22 controlled by valve 23, to tank Y, the valve 6 being closed. It is to be noted that this supernatant liquid, delivered to the tank Y, contains in solution such calcium lactate as was precipitated from the raw whey in tank A—1, during the initial neutralization of lactic acid therein. This calcium lactate may be recovered from the supernatant liquid delivered to the tank Y, by the application of the law of mass action. This is accomplished by introducing to the supernatant liquid delivered to the tank Y, a quantity of lime, sufficient to raise the pH of the liquid to from 8.5 to 9, and calcium chloride resulting in the depression of the solubility point of the calcium lactate and its deposition from the solution. It is to be noted that calcium lactate accumulates in each of the tanks C, D, and Y. Each of these tanks is provided with a plurality of valve controlled, vertically spaced draw-off lines and a common header. The draw-off lines from tank C are indicated by reference character 24 and they communicate with header 25. The tank D has draw-off lines 26 and header 27 while tank Y has draw-off lines 28 and header 29. The pure clarified effluent is drawn off from each of these tanks and may be delivered to the receiving stream. The calcium lactate is removed from these tanks through the lower draw-off lines 24, 26 and 28 and may be sent to suitable filter presses, not shown, for recovery. The washed sludge in tank A—1 from which the calcium lactate content has been removed, may be passed by line 2, pump 4, and line 30, valves 6 and 23 being closed and valve 31 open, from the tank A—1 to the sludge bed X where it joins and commingles with the sludge precipitated from the diluted whey by the successive electrolyte treatments carried out in the tanks B and B—1.

It will be understood that the electrolyte initially employed in the treatment of the whey in the tank A—1 may be any one of the electrolyte herein referred to as constituting the electrolyte in the reagents employed in treating the whey in tanks B and B—1.

To provide for the proper incorporation of the various treating materials in the liquid, each of the tanks is provided with a suitable agitator 32. A storage house 33 is provided for housing the various treating mixtures. A suitable runway 34 extends from the house 33 and leads to all of the tanks. Appropriate sheds 35 may be provided for protecting the driving mechanism for the several agitators.

In carrying out the treatments in tanks B and B—1, it is desirable to permit the sludge from the preceding operation to remain in the tank since this sludge contains substantial quantities of undissolved electrolyte which is redistributed through the liquid as a result of the agitation. This permits the use of a smaller quantity of the treating mixture in these several tanks.

By subjecting the effluent from tank B—1 to two successive 24 hour fermentation treatments, the quantity of lactose present in the effluent was reduced from 3.5% to .57%. A quantity of calcium lactate equal to substantially 73 pounds may be recovered from each thousand gallons of the effluent treated in the tanks C and D. The value of the calcium lactate recovered renders the operation of the process exceedingly profitable. It will, therefore, be noted that the process enables a cheese manufacture to dispose of the exceedingly putrescible polluting whey and derive a profit therefrom.

The foregoing description exemplifies one manner of carrying out the process. The disclosure is to be regarded as illustrative only since I contemplate within the scope of my invention such changes and modifications as may be necessary to adapt the same to the conditions at any given cheese factory.

Having described my invention, what I claim is:—

1. A process for treating whey to produce a substantially pure lactose solution capable of forming calcium lactate upon fermentation and treatment with lime which comprises effecting an alkaline reaction in the whey, and precipitation of a portion of the organic matter from the solution, diluting the solution containing the remaining organic matter reacting on the diluted solution with an alkaline reagent and an electrolyte to precipitate the remaining organic matter present in the diluted solution, coagulating the precipitated matter, and separating the effluent from the precipitate.

2. A process for treating whey to recover calcium lactate therefrom comprising initially effecting an alkaline reaction in the whey and thus neutralizing any lactic acid content in the whey permitting precipitated matter including calcium lactate, to settle from the alkaline solution as sludge, removing the supernatant liquor, water washing the sludge to dissolve therefrom the calcium lactate, thereafter subjecting the water, used for washing the sludge, which contains dissolved calcium lactate to treatment to recover therefrom the calcium lactate held in solution.

3. A process for treating whey to recover calcium lactate therefrom comprising initially effecting an alkaline reaction in the whey and thus neutralizing any lactic acid content normally in the whey permitting precipitated matter including calcium lactate, to settle from the alkaline solution as sludge, removing the supernatant liquor, water washing the sludge to dissolve therefrom the calcium lactate, thereafter subjecting the water used for washing the sludge to treatment to recover therefrom the calcium lactate held in solution, said treatment comprising raising the pH of the water solution sufficient to lower the solubility point of the calcium lactate to such a degree as will permit its precipitation from the solution.

JOHN T. TRAVERS.